United States Patent
Lewis et al.

(10) Patent No.: US 6,780,930 B2
(45) Date of Patent: Aug. 24, 2004

(54) POLYMERS AND POLYMERIZATION PROCESSES

(75) Inventors: Andrew Lennard Lewis, Surrey (GB); Laurence Gerald Hughes, Surrey (GB)

(73) Assignee: Biocompatibles UK Limited, Farnham (GB)

( * ) Notice: Subject to any disclaimer, the term of this patent is extended or adjusted under 35 U.S.C. 154(b) by 255 days.

(21) Appl. No.: 09/987,721

(22) Filed: Nov. 15, 2001

(65) Prior Publication Data

US 2002/0146581 A1 Oct. 10, 2002

(30) Foreign Application Priority Data

Nov. 16, 2000 (EP) ............................................. 00310178

(51) Int. Cl.$^7$ ................................................. C08F 2/18
(52) U.S. Cl. ........................ 524/800; 524/801; 524/832
(58) Field of Search ................................ 524/800, 801, 524/832

(56) References Cited

U.S. PATENT DOCUMENTS

| | | | |
|---|---|---|---|
| 3,497,482 A | * | 2/1970 | Hwa ........................... 526/287 |
| 5,648,442 A | * | 7/1997 | Bowers et al. .............. 526/277 |
| 5,705,583 A | | 1/1998 | Bowers et al. |
| 5,739,236 A | | 4/1998 | Bowers et al. |
| 5,783,650 A | | 7/1998 | Bowers et al. |
| 6,087,462 A | | 7/2000 | Bowers et al. |
| 6,090,901 A | | 7/2000 | Bowers et al. |
| 6,225,431 B1 | | 5/2001 | Bowers et al. |

FOREIGN PATENT DOCUMENTS

| | | |
|---|---|---|
| FR | 2 717 818 A1 | 9/1995 |
| WO | WO 93/012221 A1 | 1/1993 |
| WO | WO 94/14897 A1 | 7/1994 |
| WO | WO 01/09208 A1 | 2/2001 |
| WO | WO 01/27209 A1 | 4/2001 |

OTHER PUBLICATIONS

Yamaguchi et al., "Emulsion polymerization of styrene using phospholipid as emulsifier. Immobilization of phospholipids on the latex surface," *Makromol. Chem.*, vol. 190 (1989) pp. 1195–1205.

Sugiyama et al., "Synthesis of Poly(methyl methacrylate) Microspheres Bearing Phosphatidylcholine Analogous and Azobenzene Moieties," *Polymer Journal*, vol. 25, No. 5 (1993), pp. 521–527.

Sugiyama et al., "Adsorption of Protein on the Surface of Thermosensitive Poly(Methyl Methacrylate) Microspheres Modified with the N–(2–Hydroxypropyl) methacrylamide and 2–(Methacryloyloxy) ethyl Phosphorylcholine Moieties," *Journal of Polymer Science*, vol. 35, (1997), pp. 3349–3357.

Zimehl et al., "Some aspects of polymer colloids I. Preparation and properties of different types of latex particles," *Colloid Polymer Sci.*, vol. 268, (1990), pp. 924–933.

* cited by examiner

*Primary Examiner*—William Cheung
(74) *Attorney, Agent, or Firm*—Sughrue Mion, PLLC

(57) ABSTRACT

Emulsion polymerizations are described in which the monomers include an ethylenically unsaturated ammonium phosphate ester monomer. The processes may be conducted with high total solids, to produce a polymer latex having a solids content in the range 20 to 60%, for instance in the range 25 to 50% by weight. Preferably comonomers include lower alkyl and higher alkyl methacrylate selected to give desirable glass transition temperatures and coalescing films, zwitterionic comonomers, polyethoxylated comonomers to confer desired biocompatibility and latex stability as well as good wetting for a film formed of the polymer and may contain crosslinking monomers, reactive monomers, anionic monomers and/or cationic monomers. The latexes are stable, even when the process is carried out in the substantial absence of non-polymerisable emmulsifier. Coatings formed from the latexes containing zwitterionic comonomer have good biocompatibilising properties.

42 Claims, No Drawings

POLYMERS AND POLYMERIZATION PROCESSES

The present invention relates to polymers formed from radical polymerization of ethylenically unsaturated monomers including an ammonium phosphate ester zwitterionic monomer, and processes for producing them. In particular, the invention relates to emulsion polymerization processes for forming high solids emulsions without the incorporation of non-polymerisable emulsifier, and to the use of these emulsions to biocompatibilise substrates.

Yamaguchi et al in Makromol. Chem. (1989), 190, 1195–1205, describe an oil-in-water emulsion polymerization of styrene in the presence of polymerisable and non-polymerisable phosphoryl choline compounds as emulsifier. The latex product is stable, the non-polymerisable emulsifiers giving more regular shaped and sized spherical particles than the polymerisable emulsifiers. The polymerizations were conducted to form latexes having around 10 wt % solids. The mole percent of polymerisable emulsifier based on total monomer is around 10%. The base monomer on which the polymerizations were based was styrene.

Sugiyama et al in Polym. J. (1993) 25(5), 521–527, describe an emulsifier free radical polymerization of ethylenically unsaturated monomers comprising methylmethacrylate, in the presence of an ethylenically unsaturated ammonium phosphate ester zwitterionic monomer, using a water-soluble initiator. The latex product had a concentration of around 10% by weight polymer. Increasing the amount of zwitterionic monomer resulted in reduced stability of the latex. Whilst low levels of zwitterionic monomer reduced the particle size of microspheres in the latex product as compared to a process containing no such monomer, increasing the level from a mole % of 0.01, based on total monomer, to 0.5 resulted in an increase in the diameter of the microsphere of the product. The microspheres themselves were found to have low levels of adsorption of albumin as compared to polymethylmethacrylate polymerised in the absence of the ammonium phosphate ester zwitterionic monomer.

Sugiyama et al, in J. Polym. Sci., Part A (1997) 35, 3349–3357, describe oil-in-water emulsion polymerization of methylmethacrylate, optionally with a comonomer of hydroxypropyl methacrylamide, in the presence of 2-methacryloyloxyethyl-2'-trimethylammoniumethyl phosphate inner salt (MPC). The MPC is present at a level of about 1% based on total ethylenically unsaturated monomer. The latex product had a polymer solids concentration of around 10% by weight. Again the presence of MPC resulted in a decrease in the stability of the latex product with more aggregates being formed. The process was dependent on the choice of initiator, between potassium peroxodisulphate, and 2,2'-azobis[2-(imidazolin-2-yl)propane]dihydrochloride (ABIP). The ABIP initiated products were more influenced by the presence of the MPC monomer in terms of particle size and level of aggregates. In both Sugiyama papers, the reaction mixture was agitated at high speed, with all monomers being included in the reaction vessel at the commencement of the polymerization. It is not clear how the methylmethacrylate dispersed phase is maintained in suspension during the process for example with no MPC monomer.

Zimehl et al, in Colloid Polym. Sci. (1990) 268, 924–933 describe emulsion polymerization of polystyrene using potassium peroxodisulphate in the presence of N-(3-sulphopropyl)-N-methacrylomidyl propyl (N,N-dimethylammonium betaine) (SPP) at SPP concentrations in the range 5 to 70% by weight based on total monomer. The particle size of the latex product was dependent upon the initiator and the level of betaine comonomer. Again, all of the monomers were dispersed into the aqueous continuous phase before polymerization was initiated. The solids concentration of product latex was around 10% by weight.

In U.S. Pat. No. 3,497,482 Hwa et al describe a copolymerization of N,N-dimethyl-N-(2-methacryloyloxyethyl)-N-(3-sulphopropyl ammonium inner salt) (SPE), with ethyl methacrylate and acrylamide, in an aqueous continuous phase. Hwa produces a metastable oil-in-water product. He does not describe the particle size of the latex.

In WO-A-93/01221 we describe a range of copolymers of zwitterionic monomer with comonomers such as hydrophobic comonomers, ionic comonomers or reactive comonomers. The copolymers are formed by co-dissolving all the monomers into a solvent in which monomers and polymer are soluble and recovered by precipitation techniques. It is suggested that the product might be a micro emulsion but no examples of emulsion polymerization are given. The polymers are used to coat substrates in order to improve their biocompatibility. Whilst improvements in biocompatibility may be achieved by using molar percentages of 1% or lower of zwitterionic monomer, based on total ethylenically unsaturated monomer, it is often found that at least 20 mol % zwitterionic monomer is needed for satisfactory levels of improved biocompatibility. The higher the level of zwitterionic monomers, the greater the expense.

Zwitterionic polymers made by the techniques such as are described in WO-A-93/01221, may be blended with physically or mechanically desirable copolymers to provide blends which have good biocompatibilising properties. The level of zwitterionic monomer in the total blend is reduced, thereby rendering the product more cost effective than single component zwitterionic polymer products. Such blends are described in, for instance, WO-A1-94/14897 and PCT/GB00103985 (unpublished at the priority date of this application). PCT/GB00/03985 describes blends of MPG copolymers with higher alkyl methacrylate comonomers, blended with alkyl(meth)acrylate polymers. Such blends, co-dissolved in a suitable organic solvent may be coated onto a surface to form a coating having micro-domains of relatively hydrophilic and relatively hydrophobic character. The blends may express higher levels of phosphorylcholine groups at the surface than in the bulk of the coating. This should allow the properties of a substrate coated with the polymer to be tailored for particular biocompatibility.

It would be desirable to produce a latex having high solids, in which a zwitterionic monomer is one of the ethylenically unsaturated monomers. It would furthermore be desirable to produce a copolymer of an ammonium phosphate ester zwitterionic monomer including low levels of that monomer. It would be desirable to carry out an emulsion polymerization to produce a stable latex product having a small particle size, and low particle size distribution and which forms coatings having desirable biocompatibilising properties without using high levels of ammonium phosphate ester zwitterionic monomer.

In a new emulsion polymerization process according to the invention, a mixture of ethylenically unsaturated monomers including water-insoluble monomers is polymerised in the dispersed phase of an oil-in-water emulsion in the presence of a water-soluble radical initiator, ethylenically unsaturated monomers including an ammonium phosphate ester zwitterionic monomer the process being characterised by being carried out at component concentrations to give a latex product having a polymer solids concentration of at least 20% by weight.

In the new process, the solids concentration of the product is usually no more than 60%, preferably in the range 25 to 50% by weight.

The process of the invention may be carried out in the presence of non-polymerisable emulsifiers and/or stabilisers. It is found that it is possible for the emulsion and latex product to be adequately stabilised by the presence of the ammonium phosphate ester zwitterionic monomer, optionally in combination with other surface active monomers. The process is preferably carried out therefore in the substantial absence of non-polymerisable surfactant/emulsifier and stabiliser.

The ammonium phosphate ester zwitterionic monomer is preferably included in an amount in the range 0.01 to 5% by weight, based on the total weight of monomers. More preferably the level of the zwitterionic monomer is in the range 0.05 to 2% by weight, for instance 0.1 to 1% by weight.

The zwitterionic monomer preferably has the general formula I $$YBX \qquad\qquad I$$

in which
X is the ammonium phosphate ester zwitterionic group;
B is a bond, or a straight branched alkanediyl, alkylene oxaalkylene, or alkylene (oligooxalkylene) group, optionally containing one or more fluorine substituents; and
Y is an ethylenically unsaturated group selected from $H_2C=CR-CO-A-$, $H_2C=CR-C_6H_4-A^1-$, $H_2C=CR-CH_2A^2-$, $R^2O-CO-CR=CR-CO-O-$, $RCH=CH-CO-O-$, $RCH=C(COOR^2)CH_2-CO-O-$,

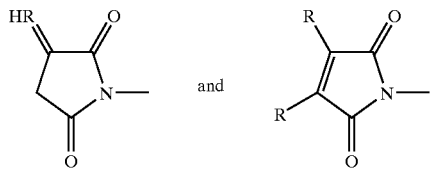

A is $-O-$ or $NR^1$;
$A^1$ is selected from a bond, $(CH_2)_nA^2$ and $(CH_2)_nSO_3-$ in which n is 1 to 12;
$A^2$ is selected from a bond, $-O-$, $O-CO-$, $-CO-O$, $-CO-NR^1-$, $-NR^1-CO$, $-O-CO-NR^1-$, and $-NR^1-CO-O-$;
R is hydrogen or $C_{1-4}$ alkyl;
$R^1$ is hydrogen, $C_{1-4}$ alkyl or BX; and
$R^2$ is hydrogen or $C_{1-4}$ alkyl.

Generally in the zwitterionic group X, the anion is closer to B than the cation. However in some zwitterions, the cation is closer to the group B than is the anion (called hereinafter phosphobetaines).

Preferably X is a group of the general formula II

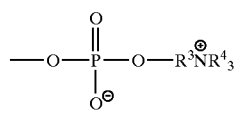

in which $R^3$ is alkanediyl of 1 or more, preferably 2–6 carbon atoms optionally containing one or more ethylenically unsaturated double or triple bonds, disubstituted-aryl (arylene), alkylene arylene, arylene alkylene, or alkylene aryl alkylene, cycloalkanediyl, alkylene cycloalkyl, cycloalkyl alkylene or alkylene cycloalkyl alkylene, and optionally contains one or more fluorine substituents and/or one or more functional groups; and
either the groups $R^4$ are the same or different and each is hydrogen or alkyl of 1 to 4 carbon atoms, preferably methyl, or aryl, such as phenyl, or two of the groups $R^4$ together with the nitrogen atom to which they are attached form an aliphatic heterocyclic ring containing from 5 to 7 atoms, or the three groups $R^4$ together with the nitrogen atom to which they are attached form a fused ring structure containing from 5 to 7 atoms in each ring, and optionally one or more of the groups $R^4$ is substituted by a hydrophilic functional group.

Alternatively X may be a group of the general formula III

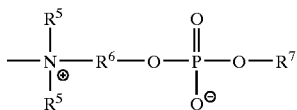

in which the group $R^5$ are the same or different and each is hydrogen, $C_{1-4}$ alkyl, such as methyl, or aryl, such as phenyl;
$R^6$ alkanediyl of 1 or more, preferably 2–6 carbon atoms optionally containing one or more ethylenically unsaturated double or triple bonds, disubstituted-aryl (arylene), alkylene arylene, arylene alkylene, or alkylene aryl alkylene, cycloalkanediyl, alkylene cycloalkyl, cycloalkyl alkylene or alkylene cycloalkyl alkylene, optionally contains one or more fluorine substituents and/or one or more functional groups;
$R^7$ is hydrogen, or an optionally substituted $C_{1-18}$ alkyl, $C_{2-18}$ alkenyl, $C_{2-18}$ alkynyl, $C_{6-24}$ aryl or $C_{7-24}$ aralkyl group.

In a group of the general formula III, $R^7$ is preferably other than hydrogen and is more preferably an unsubstituted $C_{1-6}$ alkyl, $C_{6-12}$ aryl or $C_{7-12}$ aralkyl group. Any substituents in a substituted group $R^7$ are usually fluorine atoms, or hydroxyl or $C_{1-4}$ alkoxy groups.

In the new emulsion polymerization process the monomers preferably include at least 50% by weight of ethylenically unsaturated polymerisable monomers. Examples of suitable monomers are compounds selected from the group consisting of $C_{1-12}$-alkyl(alk)acrylates, $C_{2-12}$-alkyl- and -dialkyl-(alk)acrylamides, water insoluble vinyl esters or ethers, allylic compounds, maleic or fumaric esters or imides, aconitic compounds, styrenic compounds, e.g. styrene, and mixtures thereof.

As is known in emulsion polymerization techniques, the choice of monomers affects the physical properties of the mixture, in particular whether the polymer particles of the product are able to coalesce after removal of water, for instance to form stable film coatings. It is preferred that the hydrophobic compounds are selected for their ability to form films at suitable temperatures for coating processes.

It is found that particularly desirable characteristics are achieved by using a blend of hydrophobic compounds, which would tend to confer different properties of hardness on the resultant polymer. Monomers which tend to produce hard polymers are lower alkyl(meth)acrylate especially methylmethacrylate. Compounds which tend to produce softer copolymers are alkylacrylates and methacrylates having straight or branched alkyl groups with at least 4 carbon atoms, such as butyl, hexyl, 2-ethylhexyl or n-octyl groups. Preferably the hydrophobic compound comprises a mixture of methylmethacrylate with a $C_{4-8}$ alkyl acrylate.

The emulsion polymerization itself and the properties of the product, especially the biocompatibility of films produced from the emulsion, are beneficially affected by incorporating a zwitterionic comonomer. The zwitterionic comonomer preferably comprises as cation a quaternary ammonium or phosphonium group but may comprise a tertiary sulphonium group. The anion may be a sulphonate, sulphate, phosphonate, or carboxylate anion, most preferably a sulphonate or carboxylate anion. Most preferably the comonomer is a sulpho- or carboxy-betaine monomer. The zwitterionic comonomer is suitably a compound of the general formula IV $$Y^1B^1X^1 \quad \text{IV}$$

in which $Y^1$ is an ethylenically unsaturated group selected from $H_2C=CR^8-CO-A^6-$, $H_2C=CR^8-C_6H_4-A^3-$, $H_2C=CR^8-CH_2A^4-$, $R^9O-CO-CR^8=CR^8-CO-O-$, $R^8CH=CH-CO-O-$, $R^8CH=C(COOR^9)CH_2-CO-O$,

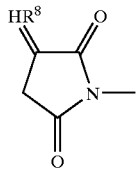 and 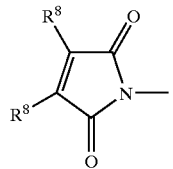

$A^6$ is —O— or $NR^{10}$;

$A^3$ is selected from a bond, $(CH_2)_mA^4$ and $(CH_2)_mSO_3-$ in which m is 1 to 12;

$A^4$ is selected from a bond, —O—, O—CO—, CO—O, —CO—$NR^{10}$—, —$NR^{10}$—CO, —O—CO—$NR^{10}$—, and $NR^{10}$—CO—O—;

$R^8$ is hydrogen or $C_{1-4}$ alkyl;

$R^{10}$ is hydrogen, $C_{1-4}$-alkyl or $B^1X^1$;

$R^9$ is hydrogen or $C_{1-4}$ alkyl;

$B^1$ is a bond, or a straight branched alkanediyl, alkylene oxaalkylene, or alkylene (oligooxalkylene) group, optionally containing one or more fluorine substituents; and $X^1$ is a zwitterionic group other than an ammonium phosphate ester.

The zwitterionic group $X^1$ may have, as anion a carboxylate group, a sulphate group, a sulphonate group or a phosphonate group, preferably carboxylate or, more preferably a sulphonate group. The zwitterionic group $X^1$ may have as cationic group an ammonium, phosphonium or sulphonium group, preferably an ammonium group.

A preferred zwitterionic group $X^1$ has the general formula V

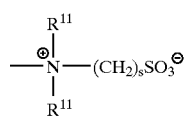

where the groups $R^{11}$ are the same or different and each is hydrogen or $C_{1-4}$ alkyl and s is from 2 to 4. Preferably the groups $R^{11}$ are the same. It is also preferable that at least one of the groups $R^{11}$ is methyl, and more preferable that the groups $R^{11}$ are both methyl. Preferably s is 2 or 3, more preferably 3.

Alternatively the zwitterionic group may be an amino acid moiety in which the alpha carbon atom (to which an amine group and the carboxylic acid group are attached) is joined through a linker group to the backbone of the biocompatible polymer. Such groups may be represented by the general formula VI

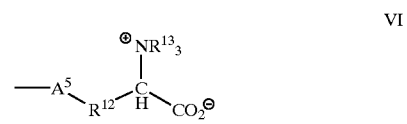

in which $A^5$ is a valence bond, —O—, —S—or —NH—, preferably —O—, $R^{12}$ is a valence bond (optionally together with $A^5$) or alkanediyl, —C(O)alkylene-, NHCOalkylene or —C(O)NHalkylene, preferably alkanediyl and preferably containing from 1 to 6 carbon atoms; and the groups $R^{13}$ are the same or different and each is hydrogen or alkyl of 1 to 4 carbon atoms, preferably methyl, or two or three of the groups $R^{13}$, together with the nitrogen to which they are attached, form a heterocyclic ring of from 5 to 7 atoms, or the three group $R^{13}$ together with the nitrogen atom to which they are attached form a fused ring heterocyclic structure containing from 5 to 7 atoms in each ring.

Alternatively the zwitterion may be a carboxy betaine $-N^{\oplus}(R^{14})_2(CH_2)_rCOO^{\ominus}$ in which the $R^{14}$ groups are the same or different and each is hydrogen or $C_{14}$ alkyl and r is 2 to 6, preferably 2 or 3.

In another embodiment, the zwitterionic group $X^1$ has the general formula VII

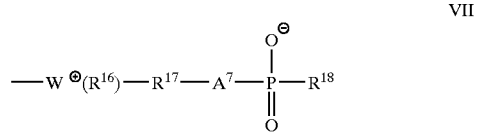

W is S, $PR^{16}$ or $NR^{16}$;

the or each groups $R^{16}$ is hydrogen or alkyl of 1 to 4 carbon atoms or the two groups $R^{16}$ together with the heteroatom to which they are attached form a heterocyclic ring of 5 to 7 atoms;

$R^{17}$ is alkanediyl of 1 to 20, preferably 1 to 10, more preferably 1 to 6 carbon atoms;

$A^7$ is a bond, NH, S or O, preferably O; and $R^{18}$ is a $C_{1-12}$ alkyl, $C_{7-18}$ aralkyl or $C_{6-18}$ aryl group or, where $A^7$ is other than a bond, is a $C_{1-12}$-alkoxy, $C_{6-18}$-aryloxy or $C_{7-18}$-aralkoxy group.

In compounds comprising a group of the general formula VII, it is preferred that W is $NR^{16}$;

each $R^{16}$ is $C_{1-4}$ alkyl; and $R^{17}$ is $C_{2-6}$ alkanediyl.

In all embodiments, in the zwitterionic comonomer of the general formula IV $Y^1$ is preferably $H_2C=CR^8-CO-A^3-$. Such acrylic moieties are preferably methacrylic, that is in which $R^8$ is methyl, or acrylic, in which $R^8$ is hydrogen. Whilst the compounds may be acrylamido compounds (in which A is $NR^{10}$), in which case $R^{10}$ is preferably hydrogen, or less preferably, methyl, most preferably the compounds are esters, that is in which $A^3$ is O. Suitable examples of comonomer of the general formula IV are SPP and SPE.

In monomers of the general formula IV, especially where Y is the preferred acrylic group, $B^1$ is most preferably an alkanediyl group. Whilst some of the hydrogen atoms of such group may be substituted by fluorine atoms, preferably $B^1$ is an unsubstituted alkanediyl group, most preferably a straight chain group having 2 to 6 carbon atoms.

Where a zwitterionic comonomer is included, the ratio of that comonomer to ammonium phosphate ester zwitterionic monomer is preferably in the range (1 to 50):1, more preferably in the range (5 to 20):1.

The ethylenically unsaturated monomers may further comprise hydrophilic monomer, for instance relatively water-soluble monomers.

Hydrophilic monomers are preferably selected from the group consisting of $C_{1-4}$-hydroxyalkyl(meth)acrylates, $C_{1-4}$-hydroxyalkyl(meth)acrylamides, $C_{1-3}$-alkoxy-$C_{2-4}$-alkyl(meth)acrylates, $C_{1-3}$-alkoxy-$C_{2-4}$-alkyl(meth)acrylamides, $C_{1-3}$-alkoxy-oligoethoxy(meth)acrylates, $C_{1-4}$-dihydroxyalkyl(meth)acrylates, N-mono- or N,N- di- $C_{1-2}$ alkyl (meth)acrylamides, N-vinyllactams, and $C_{2-4}$-hydroxyalkyl-oligoethoxy(meth)acrylates and mixtures thereof.

It has been found to be particularly useful to include, as a hydrophilic monomer, a monomer comprising an oligoethoxy moiety, that is selected from $C_{1-3}$-alkoxy-oligoethoxy(meth)acrylates and $C_{2-4}$-hydroxyalkyl-oligoethoxy(meth)acrylates, more preferably the alkoxy terminated compounds. Preferably an alkoxy group is methoxy or ethoxy. Such compounds preferably have 5 to 50 ethoxy groups, for instance in the range 10 to 20 methoxy groups. Oligoethoxylated polymerisable compounds improve the stability of the emulsion during the process, as well as the latex product, and may confer desirable wetting characteristics on a product polymer as well as useful biocompatibility.

A hydrophilic monomer is preferably included in an amount in the range 0.1 to 50% by weight of total monomers, more preferably an amount in the range 1 to 25% by weight, for instance an amount in the range 5 to 20% by weight. An oligo ethoxylated comonomer is preferably included in an amount in the range 1 to 20% by weight, more preferably in the range 5 to 10% by weight. It is often used in conjunction with one or more other hydrophilic monomers, such that the total amount of hydrophilic monomer is in the range 5 to 50% by weight.

The stability of the emulsion during polymerization is found to be improved if the pH of the emulsion is maintained slightly acidic, that is has a pH less than 7, more preferably in the range 4 to 6.8, for instance about 5. Whilst the acidity may be achieved by adding a non-polymerisable acid for instance a mineral acid, to the emulsion, it is preferable to include a polymerisable acid as one of the ethylenically unsaturated monomers. Preferably an ethylenically unsaturated acid is selected from fumaric acid, maleic acid, vinyl sulphonic acid and styrene sulphonic acid, more preferably selected from acrylic and methacrylic acids, and is most preferably methacrylic acid.

Where acidic monomer is included, it is present in an amount in the range 0.1 to 5% by weight, more preferably in the range 0.2 to 2% by weight, based on the total weight of monomers.

Other compounds, especially other monomers may be included in the polymerization mixture, for instance to achieve desired product characteristics.

It may also be desirable to include non-polymerisable components in the polymerization mixture, for instance in the continuous aqueous phase or in the dispersed oil phase, or at the interface. Non-polymerisable emulsifiers and suspending agents may be included, but are preferably not included. Drugs, especially water-insoluble, oil-soluble drugs may be added whereby they may become absorbed in the latex particles of the product.

It may be desirable to include cationic monomer, in order to provide a product polymer having an overall cationic charge.

As described in our application number WO-A-93/01221 and WO-A-98/22516, the presence of cationic groups in a polymer may confer desirable binding properties either to underlying counterionically charged surfaces, or to anionic compounds which may be contacted with a surface coated with the polymer to achieve desirable results.

A cationic monomer is preferably a compound of the general formula VIII $$Y^2B^2Q \qquad\qquad VIII$$

in which $Y^2$ is an ethylenically unsaturated group selected from $H_2C=CR^{19}-CO-A^8-$, $H_2C=CR^{19}-C_6H_4-A^9-$, $H_2C=CR^{19}-CH_2A^{10}$, $R^{21}O-CO-CR^{19}=CR^{19}-CO-O-$, $R^{19}CH=CH-CO-O-$, $R^{19}CH=C(COOR^{21})CH_2-CO-O-$,

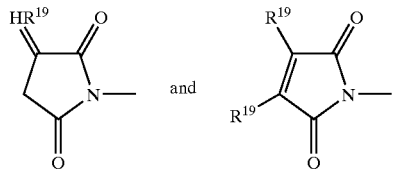
and $A^8$ is $-O-$ or $-NR^{20}-$;

$A^9$ is selected from a bond, $(CH_2)_qA^{10}$ and $(CH_2)_qSO_3-$ in which q is 1 to 12;

$A^{10}$ is selected from a bond, $-O-$, $O-CO-$, $-CO-O-$, $-CO-NR^{20}-$, $-NR^{20}-CO$, $O-CO-NR^{20}-$, and $NR^{20}-CO-O-$;

$R^{19}$ is hydrogen or $C_{1-4}$ alkyl;

$R^{20}$ is hydrogen, $C_{1-4}$ alkyl or BX.

$R^{21}$ is hydrogen or $C_{1-4}$ alkyl;

$B^2$ is a bond, or a straight branched alkanediyl, alkylene oxaalkylene, or alkylene (oligooxalkylene) group, optionally containing one or more fluorine substituents; and Q is $-N^{\oplus}R^{22}_3$, $-P^{\oplus}R^{23}_3$ or $-S^{\oplus}R_{232}$ in which either the groups $R^{22}$ are the same or different and each is hydrogen, alkyl of 1 to 6 carbon atoms, preferably methyl, $C_{1-6}$ hydroxyalkyl, aryl, such as phenyl, or $C_{7-12}$ aralkyl, or two of the groups $R^{22}$ together with the nitrogen atom to which they are attached form an aliphatic heterocyclic ring containing from 5 to 7 atoms, or the three groups $R^{22}$ together with the nitrogen atom to which they are attached form a fused ring structure containing from 5 to 7 atoms in each ring, and optionally one or more of the groups $R^3$ is substituted by a hydrophilic functional group, and the groups $R^{23}$ are the same or different and each is $R^{22}$ or a group $OR^{22}$, where $R^{22}$ is as defined above mutatis mutandis.

In the cationic monomer of the general formula VIII Q is preferably $-N^{\oplus}R^{22}_3$, in which each $R^{22}$ is a $C_{1-4}$ alkyl group, preferably each $R^{22}$ being methyl. The group $Y^2$ is preferably an acrylic group, that is of the formula $H_2C=CR^{19}COA^8$. In such groups $R^{19}$ is either hydrogen or methyl, preferably methyl, and $A^8$ is preferably —O—. $B^2$ is preferably a $C_{2-618}$ alkanediyl group, more preferably a $C_{2-6}$ alkanediyl. Examples of suitable cationic monomers are 2-(N,N-dimethylamino)ethyl methacrylate methyl chloride or methyl sulphate salt, and 2-(N,N-dimethyl amino) ethyl acrylate methyl chloride or methyl sulphate salt.

A cationic monomer may be included in an amount in the range 0.1 to 25% by weight, more preferably an amount in the range 1 to 20% by weight, most preferably in an amount in the range 2 to 15% by weight.

Other monomers which may useful be included in the mixture include functional monomers, comprising reactive groups which are useful to provide attachment points for ligands or for underlying substrate surfaces having co-reactive functional groups, or to provide inter- or intra-molecular crosslinkability. Such functional groups may react with co-reactive groups derived from other functional monomers such as hydroxyl or amine group containing monomers.

Preferably a reactive monomer has the general formula IX $$Y^3B^3Q^1 \qquad\qquad IX$$

in which $Y^3$ is an ethylenically unsaturated group selected from $H_2C=CR^{24}-CO-A^{11}-$, $H_2C=CR^{24}-C_6H_4-A^{12}$, $H_2C=CR^{19}-CH_2A^{13}$, $R^{26}O-CO-CR^{24}=CR-CO-O-$, $R^{24}CH=CH-CO-O-$, $R^{24}CH=C(COOR^{26})CH_2-CO-O-$,

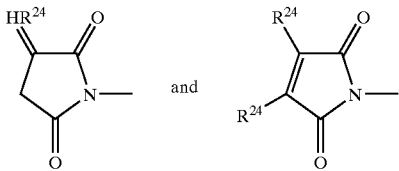

and $A^{11}$ is —O— or $-NR^{25}$;

$A^{12}$ is selected from a bond, $(CH_2)_rA^{13}$ and $(CH_2)_rSO_3-$ in which r is 1 to 12;

$A^{13}$ is selected from a bond, —O—, O—CO—, CO—O, —CO—$NR^{25}$—, —$NR^{25}$—CO, —O—CO—$NR^{25}$, and $NR^{25}$—CO—O—;

$R^{24}$ is hydrogen or $C_{1-4}$ alkyl;

$R^{25}$ is hydrogen, $C_{1-4}$-alkyl or $B^3Q^1$;

$R^{26}$ is hydrogen or $C_{1-4}$ alkyl;

$B^3$ is a bond, or a straight branched alkanediyl, alkylene oxaalkylene, or alkylene (oligooxalkylene) group, optionally containing one or more fluorine substituents.

$Q^1$ is a reactive group selected from the group consisting of aldehyde groups; silane and siloxane groups containing one or more substituents selected from halogen atoms and $C_{1-4}$-alkoxy groups; hydroxyl; amino; carboxyl; epoxy; —CHOHCH$_2$Hal (in which Hal is selected from chlorine, bromine and iodine atoms); succinimido; tosylate; triflate; imidazole carbonyl amino; optionally substituted triazine groups; cinnamyl; ethylenically and acetylenically unsaturated groups; acetoacetoxy; methylol; and chloroalkylsulphone groups; acetoxy; mesylate; carbonyl di(cycloalkyl carbodiimidoyl; and oximino.

Preferred groups $Q^1$ are aldehyde, reactive silane and siloxane, amino, epoxy, CHOHCH$_2$Hal (in which Hal is halogen), succinimido, tosylate, triflate, imidazolecarbonyl amino and optionally substituted triazine groups. Most preferably $Q^1$ is a trialkoxy silyl group, such as a trimethoxysilyl group.

In the reactive monomer of the general formula IX the ethylenically unsaturated group $Y^3$ is preferably and acrylic type group, that is a group $H_2C=CR^{24}A^{11}-$, $R^{24}$ preferably being hydrogen or, most preferably, methyl and $A^{11}$ preferably being —O—. Preferred groups $B^3$ are $C_{2-18}$ alkanediyl, most preferably $C_{2-6}$-alkanediyl.

The emulsion polymerization of the invention may be carried out in a single step, in which all of the monomers are dispersed into an aqueous continuous phase and agitation applied to form an emulsion having suitable sized droplets followed by initiation of polymerization. However, optimum particle size distribution is achieved if a two-step process is used, in a first step of which a seed polymer is formed, and in the second step the seeds are grown. In such a process, the seed monomers are dispersed into the aqueous phase and polymerization is initiated. To the seed polymer latex, the remaining monomers and additional initiator are added, so that polymerization is initiated at the seeds. Monomer travels from monomer droplets to the polymer seeds.

Preferably in a process involving a seed polymerization step, the monomers from which the seed polymer is formed comprise at least a portion of the ammonium phosphate ester zwitterionic monomer which is preferably added to the polymerization mixture in the form of an aqueous solution. The seed monomers must include at least a portion of the water-insoluble monomers. These monomers are dispersed into the aqueous continuous phase in the presence of the ammonium phosphate ester zwitterionic monomer whereby an emulsion of seed monomer is formed. Polymerization is initiated by radical initiator by a water-soluble initiator.

After seed polymerization has continued until the yield of polymer is at least 1% based on solids, seed growth emulsion polymerization step is then carried out by adding further monomer including at least a portion of the remaining water-insoluble monomer to the emulsion, along with further water-soluble initiator. It may be desirable for the polymer formed after the initial seed polymerization step to have a substantially constant composition. In this case, it is desirable for a water-immiscible liquid containing the water-insoluble monomers and other compatible comonomers and for this mixture to be added in a single addition step or continuously over an extended period to the aqueous reaction mixture. If any of the monomers selected components for the ethylenically unsaturated monomers are immiscible with the water-insoluble monomer blend, it may be desirable for the or all of the monomers of that type to be added separately to the polymerization mixture, for instance in the form of an aqueous solution.

It is preferred that the monomer blend be added over a period during which polymerization continues to the reaction mixture, and that polymerization be continued after all of the monomer has been added. During the monomer feed period, it is preferred for initiator to be continuously added to the reaction mixture. Preferably a portion of initiator is retained until after all of the monomer has been added to the mixture and is then included to minimise the level of residual unpolymerised monomer in the product.

It may be desirable for the polymerization to form a core-shell morphology. Such morphologies are generally achieved by carrying out the polymerization, generally after a seed polymerization step, in two or more phases. Generally the polymer formed in the two or more phases differs in terms of the monomers used and/or their ratios. Using such techniques it is possible to form a product latex in which the polymer particles have tailored characteristics with cores and shells of desired hardness, desired hydrophilicity or desired porosity. Such characteristics are achieved by selecting monomers according to their glass transition temperatures, hydrophilicities, or crosslinkability. To achieve a low porosity product, for instance, it may be desirable to incorporate di-, tri- or higher-functional ethylenically unsaturated monomers, or to include functional monomers which may be reacted with the same or different functional monomers during or after polymerization to provide intermolecular crosslinks.

Core/shell morphology may be achieved by changing the composition of monomers added to the polymerization mixture during the polymerization process. Thus monomers for forming the core should be added and polymerised in the mixture before addition of monomers for forming the shell.

In one particular embodiment of the process of the invention, a zwitterionic comonomer is included as part of the ethylenically unsaturated monomer and is added to the polymerization mixture as a component of the aqueous initiator composition, and is preferably added continuously over a monomer feed period during which water-insoluble monomer blend is separately added to the polymerization mixture. Preferably a monomer feed period is conducted for a period in the range 5 to 1200 minutes, most preferably in the range 30 to 240 minutes.

By the use of the ammonium phosphate ester zwitterionic monomer it has been found possible to conduct the emulsion polymerization under conditions such that high solid content latex products are formed. Thus the level of polymer in the latex product may be higher than 20% by weight, for instance up to 6%, preferably in the range 20 to 60% by weight, without adversely affecting the stability nor viscosity. Such latexes are convenient to handle. Whilst water may be evaporated from the product latex to achieve such high solids materials, or the polymer particles may be recovered by agglomeration or coagulation techniques and redissolved into water, preferably no such steps are carried out to achieve the 20 to 50% by weight solids latex. Alternatively the latex may be diluted before use or compounded with other ingredients compatible with its end use, such as water, other latices or coalescing aids. Coalescing aids may assist in the film formation of the final product, especially where the polymer is film forming at a higher temperature than room temperature. One suitable component is a latex preservative, for instance which inhibits bacterial growth or is a biocide or fungicide, suitably an alcohol such as benzyl alcohol.

It is believed that this is the first time that ammonium phosphate ester zwitterionic monomers have been used in emulsion polymerization processes including a seed polymer formation phase. According to a further aspect of the invention there is provided a seeded emulsion polymerization process in which a mixture of ethylenically unsaturated monomers including water-insoluble monomers and an ammonium phosphate ester zwitterionic monomer is copolymerised in the dispersed phase of an oil-in-water emulsion in the presence of a water-soluble radical initiator comprising the steps i) providing an aqueous solution comprising at least a portion of the ammonium phosphate ester zwitterionic monomer and a portion of the initiator;

ii) forming a dispersed phase comprising a monomer seed composition comprising at least a portion of the water-insoluble monomers to form a seed emulsion;

iii) initiating polymerization of the seed emulsion whereby a seed latex is formed;

iv) providing a seed growth monomer mixture comprising the remaining water-insoluble monomers; and v) adding the monomer cell mixture to the seed polymer latex and initiating polymerization of the monomers of the seed growth mixture in the dispersed seeds, to form a product polymer latex.

In the seeded emulsion polymerization process it is preferred that all of the ammonium phosphate ester zwitterionic monomer is present in the seed polymerization mixture.

Whilst the novel seeded polymerization process may be carried out to provide a relatively low solid product polymer latex of less than 20%, for instance in the range 2 to 20%, it is possible to carry out the process under conditions such that the product latex has a solid concentration in the range 20 to 60% by weight.

The seeded polymerization process allows formation of a product polymer latex having very low distribution of product particle size. The particle size may be controlled by the levels of seed monomer, initiator and seed growth monomer, as well as the choice of the type and amount of ammonium phosphate ester zwitterionic monomer, as well as other monomer components. Preferably the product latex has dispersed phase with average particle diameter of less than 1 $\mu$m, more preferably less than 500 nm, most preferably in the range 100 to 400 nm. Preferably the polydispersity of particle size (number average over weight average diameter) is in the range 1.0 to 2.0.

It is preferred that the level of initiator for these low particle size distributions is in the range 0.001 to 0.5 weight % based on solids, preferably in the range 0.01 to 0.1 weight %. Preferably the ratio of weight of combined seed monomer to seed growth polymer is in the range 1:99 to 99:1, preferably in the range 1:50 to 1:10.

The seeded emulsion polymerization technique may be used to form a core-shell polymer product, using the techniques described above in connection with the first aspect of the invention. In such a process the seed growth monomers comprise two or more mixtures including a core mixture and a shell mixture, usually differing in terms of composition.

The seeded emulsion polymerization process has preferred components as described above in connection with the first aspect of the invention.

The polymer latex product of the first aspect of the invention forms a further aspect of the invention. A novel stable latex comprises a dispersion of polymer particles in aqueous continuous phase, having a polymer concentration in the range 20 to 60% by weight based on the total weight of the latex, an average particle diameter of less than 1 $\mu$m, the polymer being formed from radical polymerised ethylenically unsaturated monomers comprising water-insoluble monomer and ammonium phosphate ester zwitterionic monomer.

The novel latex may further comprise additional components. For instance it may be desirable to add to the latex suspended particulate solids selected from organic and inorganic water-insoluble materials. Particularly preferred are suspended inorganic solids such as pigments, preferably having particle sizes less than 1 $\mu$m. The latex may additionally comprise dissolved or miscible components for instance to improve the storage stability of the latex, or to provide additional properties for the product of the final dried film. For instance, drugs may be incorporated into the latex, either by adding a suspension or an aqueous or organic solvent-based solution to the latex. Colouring agents may also be included.

The novel latex, or the product of one of the novel polymerization processes, may be used as a coating composition.

According to a further aspect of the invention there is provided a novel coating process in which such a dispersion is coated onto a substrate to form a liquid coating on a surface thereof, and water is removed from the liquid coating to form a stable solid polymer coating on the said surface. Generally water is removed by evaporation although contact with precipitating solvents may also be utilised. Evaporation may be conducted at raised temperature and/or reduced pressure, and coalescing acids, such as alcohols, esters, glycols or other ethers, may be used to provide added control over film formation.

Preferably water removal is conducted under conditions of raised temperature under which the polymer particles coalesce to form a coherent and substantially void-free, preferably clear film.

The dried film may be subjected to additional steps such as curing, for instance by heating, especially where the monomers include a cross-linking monomer such as monomers of the general formula IX above. Gamma or other e.m. radiation or ethyleneoxide treatment may also be carried out to cure and/or sterilise the film.

The product films have particularly desirable biocompatibilising properties. They are generally used in environments in which the coated surface is contacted with aqueous liquids, generally biological liquids, for instance containing dissolved protein or suspended cells, such as bacterial or, preferably, blood cells. Preferably such liquids are selected from blood and serum.

According to a further aspect of the invention there is provided a novel biocompatibilising process in which a substrate is biocompatibilised by coating it with a latex according to the third aspect of the invention or which is the product of a process according to the first or second aspects of the invention, water is removed, to leave a stable coating of solid polymer on the surface.

Some of the monomer compositions used in the first and second aspects of the invention are believed to be novel in themselves. Whilst the novel emulsion polymerization techniques are believed to optimise the polymer properties, it is possible that other techniques may be suitable for copolymerising these monomers to form polymers having desirable characteristics. Such novel polymers are obtainable by radical polymerization of ethylenically unsaturated monomers comprising:

i) 0.1 to 25% by weight of an ammonium phosphate ester zwitterionic monomer;
ii) 0.1 to 25% by weight of a zwitterionic comonomer different to i); and
iii) 25 to 99% of a hydrophobic monomer.

Preferably this hydrophobic monomer is a compound as described above. Most preferably it is selected from the group consisting of $C_{1-12}$-alkyl(alk)acrylates, $C_{2-12}$-alkyl- and -dialkyl-(alk)acrylamides and styrene, and mixtures thereof.

The novel polymers may further comprise:

iv) 0.01 to 50% by weight hydrophilic monomer, preferably selected from the group consisting of $C_{1-4}$-hydroxyalkyl(meth)acrylates, $C_{1-4}$-hydroxyalkyl(meth)acrylamides, $C_{1-3}$-alkoxy-$C_{2-4}$-alkyl(meth)acrylates, $C_{1-3}$-alkoxy-$C_{2-4}$-alkyl(meth)acrylamides, $C_{1-3}$-alkoxy-oligoethoxy(meth)acrylates, $C_{1-4}$-dihydroxyalkyl(meth)acrylates, N-mono- or N,N- di-$C_{1-2}$ alkyl (meth)acrylamides, N-vinylactams, and $C_{2-4}$-hydroxyalkyl-oligoethoxy(meth)acrylates and mixtures thereof.

The hydrophilic monomer preferably comprises an oligoethoxylated compound, preferably in an amount in the range 0.1 to 10% by weight based on the total weight of monomer. Preferably such a monomer is selected from $C_{1-3}$-alkoxy-oligoethoxy(meth)acrylates and $C_{2-4}$-hydroxyalkyl-oligoethoxy(meth)acrylates, more preferably the alkoxy terminated compounds.

In one embodiment the novel polymer comprises 0.01 to 20% by weight, more preferably 0.1 to 5% by weight reactive monomer, comprising the general formula X defined above.

In another embodiment of the invention, the monomers include 0.01 to 10%, preferably 0.1 to 2% by weight anionic monomer, preferably selected from fumaric acid, maleic acid, vinyl sulphonic acid and styrene sulphonic acid, more preferably selected from acrylic and methacrylic acids, and is most preferably methacrylic acid.

In another embodiment of the polymer of the invention, the monomers include 1 to 25%, preferably 2 to 15% cationic monomer, preferably a compound of the general formula VIII defined above.

There is also provided in the present invention a film formed of the novel polymer. Preferably the film is a coherent, substantially void free film, preferably in the form of a coating on a surface of a substrate. The substrate is preferably the surface of a device for use in contact with biological fluids or organs, especially a device used in contact with aqueous liquids susceptible to fouling by proteins, carbohydrates, microbes or cells of higher organisms, cell culture substrates, assay devices, biosensors etc. Most preferably the substrate is the surface of a medical device, for instance an ophthalmic device such as a contact lens, a corneal onlay or an ophthalmic implant, or is a coating on a prosthesis, a guidewire, a catheter, a drug delivery implant, a stent, a vascular graft, a blood filter or extra corporeal circuitry components In a drug delivery device, the active drug may be incorporated into the film by being a component of the coating latex, or by contacting the coated product, before or after curing, with a suitable drug to allow absorption or adsorption in or to the film.

The following examples illustrate the invention:

EXAMPLE 1

The following components are used in a seeded emulsion polymerization technique as described below:

TABLE 1

|  | % | (g) |
|---|---|---|
| Reactor Charge |  |  |
| Demin water | 59.79 | 179.37 |
| HEMA-PC | 0.23 | 0.69 |
| Monomer Seed |  |  |
| Methyl Methacrylate | 0.44 | 1.32 |
| Butyl Acrylate | 0.44 | 1.32 |
| Initiator Seed |  |  |
| Initiator | 0.02 | 0.06 |
| Demin water | 2.66 | 7.98 |
| Monomer Feed (Controlled pumping) |  |  |
| Methyl methacrylate | 7.3 | 21.9 |
| Butyl acrylate | 7.3 | 21.9 |
| Trimethoxysilylpropyl methacrylate | 0.77 | 2.31 |
| Hydroxypropyl methacrylate | 2.21 | 6.63 |
| MethoxyPEG methacrylate (mwt 550) | 1.31 | 3.93 |
| Methacrylic acid | 0.11 | 0.33 |
| Initiator Feed (Controlled pumping) |  |  |
| Initiator | 0.07 | 0.21 |
| Demin water | 10.33 | 30.99 |
| Dimethylammoniumpropyl sulphonate, ethyl methacrylate | 3.5 | 10.5 |

TABLE 1-continued

|  | % | (g) |
|---|---|---|
| Mop up Feed | | |
| Demin water | 2 | 6 |
| Initiator | 0.02 | 0.06 |
| Alcohol addition | | |
| Demin water | 1 | 3 |
| Benzyl alcohol | 0.5 | 1.5 |
| Total | 100 | 300 |

The reactor charge was first loaded into the reaction vessel. The internal reaction temperature was raised to 75° C. using a nitrogen purge for 45 minutes. Once the temperature was reached and the 45 minutes elapsed the nitrogen purge was switched to a blanket whilst stirring at 250 to 300 rpm. The monomer seed was then added and the reaction held for 10 minutes. The initiator seed was then added and the reaction held for a further 10 minutes. The internal temperature was then raised to 85° C. over a period of 30 minutes allowing for any light exotherms to occur. (These are usually in the order of 2–3° C.). A colour change in the reactor charge ingredients was observed from a grey to a blue white colour indicating micelle formulation.

Once the 85° C. temperature had been reached the monomer and initiator feeds were fed simultaneously over 150 minutes at 85° C. When the feed solutions had been added the reaction was held at 85° C. for a further half hour. The initiator mop-up feed was then added over one hour at 85° C. The reaction mix was then cooled to 40° C. and the alcohol added. The reaction was held at 40° C. for a further 10 minutes. The polymer was then filtered through an 80 μm nylon mesh and then stored as a dispersion.

The particle size dispersion was measured by Disk centrifuge Photosedimentometry (DCP). This technique is based on Stokes Law. The number average diameter was 107 nm with a standard deviation of 31 nm and the weight average diameter was 181 nm with a standard deviation of 86 nm.

The product was analysed to determine the levels of residual monomer. The results are shown in Table 2 below.

TABLE 2

| Residual Monomer | |
|---|---|
| Monomer | ppm |
| methylmethacrylate | <30 |
| butylacrylate | <30 |
| methacrylic acid | <5 |
| hydroxypropylmethacrylate | <25 |
| silyl monomer | <5 |
| sulphobetaine monomer | <1800 |
| MPC | <5 |

EXAMPLE 2—COATING PROCESS

The product of Example 1 was diluted with demineralised water to a concentration of 10 g/l (solids). The coating process, in each case, involved cleaning the substrates with dichloromethane then somicating the substrates in ethanol for two minutes. The cleaned substrates were then coated with the diluted product latex, allowed to dry for five minuted at room temperature, then placed in an oven at 70° C. for four hours to cure and cross-link the film.

The coated substrates were subjected to various tests for biocompatibility.

2.1 Fibrinogen Adhesion

In the first test the extent of fibrinogen adhesion to the substrate is tested using the protocol substantially as described in WO-A-9301221. The control, uncoated substrates were also tested and the levels of reduction are shown in Table 3.

TABLE 3

| Fibrinogen Reduction (Fg) on Various Substrates | | |
|---|---|---|
| | Uncoated | Coated |
| Substrate | Mean Absorbance @ 450 nm (S.D) | |
| Glass | 1.772 (0.200) | 0.807 (0.074) |
| Steel | 1.756 (0.223) | 0.382 (0.053) |
| PVC | 1.283 (0.227) | 0.461 (0.119) |
| PET | 1.472 (0.164) | 0.499 (0.067) |

2.2 E. coli Adhesion

The adhesion of E. coil to the substrates was tested using the following technique: The samples were incubated with E. coli in a nutrient broth (Oxoid) for 4 or 18 hours at 37° C. The samples were washed in phosphate buffered saline and incubated with a 1% solution of bovine serum albumin in phosphate buffered saline for 1 hour. This treatment is intended to block surface portions not coated with E. coli to prevent non-specific attachment of the reagent in the next step of the process. After washing in phosphate buffered saline, the sample were incubated with rabbit E. coli polyclonal antibody conjugated to horseradish peroxidase (1/200) for 1 hour, washed for 10 minutes in phosphate buffered saline and incubated with a chromogenic substrate OPD (orthophenylene diamine) substrate buffer for a predetermined period in the range 10–20 minutes. The absorbance was read at 450 nm. This enzyme linked immunoassay result is recognised to correlate to the level of adhesion of E. coli cells.

The results are shown in Table 4.

TABLE 4

| E-Coli Reduction on Various Substrates | | |
|---|---|---|
| | Uncoated | Coated |
| Substrate | Mean Absorbance @ 450 nm (S.D) | |
| Glass | 1.850 (0.173) | 0.381 (0.091) |
| Steel | 0.439 (0.095) | 0.184 (0.032) |
| PVC | 0.867 (0.237) | 0.173 (0.091) |
| PET | 0.634 (0.282) | 0.255 (0.016) |

The results show that, on all four substrates, the polymers of the invention confer desirable biocompatibility as illustrated by the fibrinogen adsorption and E. coli adhesion tests.

2.3 Blood Cell Adhesion to Blood Filter Material

In a further performance test, the latex was used to coat a blood filter formed of polyethylene terephthate (PET). The coated filter was contacted with whole blood and observed as described in WO-A-9301221. The product was observed under scanning electron microscope. Whilst the coated product may be seen to contaminated by high levels of deposited material, the coated filter appears to have no adhered materials.

EXAMPLE 3—OTHER POLYMERS

The emulsion polymerization process described in Example 1 was repeated but omitting one or more of the ammonium phosphate ester zwitterionic monomer, betaine comonomer and PEG monomer. The various latexes were analysed to determine the number average particle size and weight average particle size using the above techniques.

It was found that the omission of the sulphobetaine monomer reduced the stability of the emulsion, resulting in some build up of coagulum. The number average molecular weight following filtration of the latex product was determined to be 133 nm (standard deviation 41 nm), whilst the weight average values were 186 (78) nm.

For the polymer in which the PEG was omitted, the particle size of the latex remained low and with a low spread (number average particle size 100(21) nm, weight average 119 (33) nm), but the coated polymer had reduced wettability as judged by determining the critical wetting surface tension on the filter of the type used in Example 2.

Where ammonium phosphate ester zwitterionic monomer was omitted, there was a significant reduction in latex stability with a build up of coagulum. The number average particle size was measured at 151(51) nm with the weight average being 227 (96) nm.

Omitting both zwitterionic monomers resulted in poor particle size control as well as higher particle sizes and a bimodal distribution of particle sizes. The number average particle size was 394(73) nm with the weight average being 433(75) nm.

Omitting both PEG based monomer and ammonium phosphate ester zwitterion again resulted in inadequate latex stability with a build up of coagulum. The measured particle sizes were number average 160(43) nm and weight average 210 (98) nm. This product also had poor critical wetting surface tension for the coated filter.

Where both betaine monomer and PEG based monomer were omitted, inadequate latex stability was achieved with a build up of coagulum. The particle sizes were greatly increased as compared to the polymer of Example 1, with number average being 510(55) nm and the weight average being 531(69) nm.

Omitting both zwitterionic monomers and the PEG monomer resulted in a very poor emulsion, with very high particle sizes and particle size spreads. The number average particle size was 754(211) nm with the weight average being 1012 (382) nm.

EXAMPLE 4—POLYMER WITH CATIONIC COMONOMER

The monomer composition and polymerization process described above for Example 1 was adapted to incorporate 5 or 10% by weight cationic monomer as part of the mainfeed, retaining the same relative concentrations of the remaining monomers and same overall total solids content.

The latex product was coated using the general technique desribed in Example 2 onto the filters used in Example 2.3 and tested for their critical wetting surface tension. The results show that the CWST for the 5% cationic polymer was raised to 65 dyne/cm, as compared to 55 for the filter coated according to Example 2 and 45 dyne/cm for the uncoated filter.

A glass coverslip coated using the same general technique as in Example 2 was analysed by atomic force microscope for coating smoothness, thickness and the removal force. The average coating smoothness was 6.5 nm as compared to 4.0 nm for the uncoated glass. The thickness was in the range 30 to 150 nm. The removal force was 2.850 $\mu$N.

EXAMPLE 5—CORE-SHELL LATEX PREPARATION

The reactor was loaded with 129 g of distilled water and 0.69 g of MPC, following which the temperature was raised to 75° C. with nitrogen purge and stirring at 270 rpm. The monomer seed was added (1.32 g methyl methacrylate and 1.32 g butyl acrylate) and after 5 minutes the initiator seed was added (0.06 g ammonium persulfate (APS) in 8 g water). The reaction temperature was raised to 85° C. for 30 minutes after which the core monomer feed was added (15.12 g methyl methacrylate, 3.78 g butyl acrylate, 0.6 g ethylene glycol dimethacrylate and 0.6 g methoxypolyethylene glycol methacrylate (550 Mw)) together with another initiator feed (0.21 g APS, 10.5 g MPC in 31 g water). Monomer was added over approximately an hour and immediately followed by a shell feed (12.8 g methyl methacrylate, 12.8 g butyl acrylate, 2.3 g trimethoxysilyl propyl methacrylate, 6.6 g hydroxypropylmethacrylate and 3.0 g of methoxy-polyethylene glycol methacrylate (550 Mw) and 0.3 g methacrylic acid). This was held at 85° C. for a further hour before addition of an initiator spike (0.06 g APS in 6.0 g water) and a further 30 minutes reaction time before being cooled. The solution was filtered through glass wool to remove a small amount of coagulum from the stirrer. 1.5 g benzyl alcohol was added in 3.0 g water as preservative.

The latex was cast onto a glass plate to form a tough film that was cured to an insoluble film upon heating at 70° C. in an oven.

Particle analysis of the milky white liquid showed the following characteristics of the latex:

| | |
|---|---|
| Helium pycnometry for average density (n = 3): | 1.1755 cm$^3$ ± 0.0019 (1) |
| | 1.1727 cm$^3$ ± 0.0136 (2) |
| | 1.1707 cm$^3$ ± 0.0099 (3) |
| Disk centrifugation photosedimentometry for weight average (n = 2): | 0.1610 ± 0.045 $\mu$m (1) |
| | 0.1600 ± 0.049 $\mu$m (2) |
| Polydispersity (n = 2): | 1.238 (1) |
| | 1.280 (2) |

What is claimed is:

1. An emulsion polymerization process comprising the following steps:
   a) providing a mixture of ethylenically unsaturated monomers including water insoluble monomer;
   b) dispersing the mixture of ethylenically unsaturated monomers into an aqueous liquid to form an oil-in-water emulsion;
   c) adding to the oil-in-water emulsion an ammonium phosphate ester zwitterionic monomer;
   d) adding a water-soluble radical initiator to the oil-in water emulsion;
   e) polymerizing the monomers to form a product latex of polymer having a polymer solids concentration in the product of at least 20% by weight.

2. An emulsion polymerization process according to claim 1 in which the solids concentration of the product is up to 60%.

3. An emulsion polymerization process according to claim 2 in which the solids concentration of the product is in the range 25 to 50%.

4. An emulsion polymerization process according to claim 1 in which the oil-in-water emulsion is substantially free of non-polymerisable surfactants.

5. An emulsion polymerization process according to claim 1 in which the ammonium phosphate ester zwitterionic monomer is included in the process in an amount in the range 0.01 to 5% by weight based on the total weight of monomers.

6. An emulsion polymerization process according to claim 5 in which the said amount is in the range 0.05 to 2% by weight.

7. An emulsion polymerization process according to any preceding claim in which the ammonium phosphate ester zwitterionic monomer has the general formula I $$YBX \qquad\qquad I$$

in which

X is said ammonium phosphate ester zwitterionic group;

B is selected from the group consisting of a bond, and straight and branched alkanediyl, alkylene oxaalkylene, and alkylene (oligooxalkylene) groups, optionally containing one or more fluorine substituents; and Y is an ethylenically unsaturated group selected from the group consisting of $H_2C=CR-CO-A-$, $H_2C=CR-C_6H_4-A^1-$, $H_2C=CR-CH_2A^2-$, $R^2O-CO-CR=CR-CO-O-$, $RCH=CH-CO-O-$, $RCH=C(COOR^2)CH_2-CO-O-$,

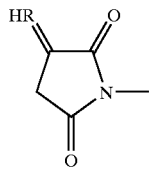 and 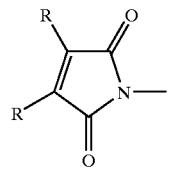

A is $-O-$ or $NR^1$;

$A^1$ is selected from the group consisting of a bond, $(CH_2)_nA^2$ and $(CH_2)_nSO_3-$ in which n is 1 to 12;

$A^2$ is selected from the group consisting of a bond, $-O-$, $O-CO-$, $-CO-O$, $-CO-NR^1-$, $-NR^1-CO$, $-O-CO-NR^1-$, and $-NR^1-CO-O-$;

R is hydrogen or $C_{1-4}$ alkyl;

$R^1$ is selected from the group consisting of hydrogen, $C_{1-4}$ alkyl and BX; and $R^2$ is hydrogen or $C_{1-4}$ alkyl.

8. An emulsion polymerization process according to claim 1 in which the monomers include at least 50% by weight based on total ethyleneically unsaturated monomers of a hydrophobic ethylenically unsaturated polymerisable compound.

9. An emulsion polymerization process according to claim 8 in which the said hydrophobic compound is selected from the group consisting of $C_{1-12}$ alkyl(alk)acrylates and $C_{2-12}$-alkyl and -dialkyl(alk)acrylamides, styrene, and mixtures thereof.

10. An emulsion polymerization process according to claim 1 comprising further adding to the oil-in-water emulsion a sulpho- or carboxy-betaine monomer.

11. An emulsion polymerization process according to claim 10 in which the weight ratio of betaine monomer to ammonium phosphate ester zwitterionic monomer is in the range (1–50):1.

12. An emulsion polymerization process according to claim 11 in which the said ratio is in the range (5–20):1.

13. An emulsion polymerization process according to claim 1 comprising adding to the oil-in-water emulsion a hydrophilic monomer.

14. An emulsion polymerization process according to claim 13 in which the ydrophilic monomer is selected from the group consisting of $C_{2-4}$-hydroxyalkyl(meth)acrylates, $C_{1-4}$-hydroxyalkyl(meth)acrylamides, $C_{1-3}$-alkoxy-$C_{2-4}$-alkyl(meth)acrylates, $C_{1-3}$-alkoxy-$C_{2-4}$-alkyl(meth)acrylamides, $C_{1-3}$-alkoxy-oligoethoxy(meth)acrylates $C_{1-4}$-dihydroxyalkyl(meth)acrylamides, N-mono- and N,N- di- $C_{1-2}$ alkyl (meth)acrylamides, N-vinylactams and $C_{2-4}$ hydroxyalkyl oligoethoxy(meth)acrylates, and mixtures thereof.

15. An emulsion polymerization process according to claim 13 in which the said hydrophilic monomer is added in an amount in the range 0.1 to 50% by weight, based on the total weight of monomer.

16. A process according to claim 15 in which the said range is 5 to 20% by weight.

17. An emulsion polymerization process according to claim 1 comprising adding to the oil-in-water emulsion an acidic monomer in an amount to confer an acidic pH on the oil-in-water emulsion.

18. An emulsion polymerization process according to claim 17 in which the acidic monomer is acylic acid or methacrylic acid, and it is present in an amount in the range 0.1 to 5% by weight based on the total weight of monomers.

19. An emulsion polymerization process according to claim 1 comprising adding to the oil-in-water emulsion a cationic monomer, of the general formula VIII $$Y^2B^2Q \qquad\qquad VIII$$

in which $Y^2$ is an ethylenically unsaturated group selected from the group consisting of $H_2C=CR^{19}-CO-A^8-$, $H_2C=CR^{19}-C_6H_4-A^9-$, $H_2C=CR^{19}-CH_2A^{10}$, $R^{21}O-CO-CR^{19}=CR^{19}-CO-O-$, $R^{19}CH=CH-CO-O-$, $R^{19}CH=C(COOR^{21})CH_2-CO-O-$,

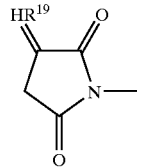 and 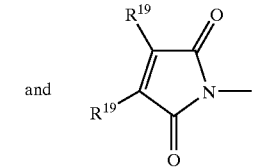

$A^8$ is $-O-$ or $-NR^{20}-$;

$A^9$ is selected from the group consisting of a bond, $(CH_2)_qA^{10}$ and $(CH_2)_qSO_3-$ in which q is 1 to 12;

$A^{10}$ is selected from the group consisting of a bond, $-O-$, $O-CO-$, $-CO-O$, $-CO-NR^{20}-$, $-NR^{20}-CO$, $O-CO-NR^{20}-$, and $NR^{20}-CO-O-$;

$R^{19}$ is hydrogen or $C_{1-4}$ alkyl;

$R^{20}$ is selected from the group consisting of hydrogen, $C_{1-4}$-alkyl and BX;

$R^{21}$ is hydrogen or $C_{1-4}$ alkyl;

$B^2$ is selected from the group consisting of a bond, and straight and branched alkanediyl, alkylene oxaalkylene, and alkylene (oligooxalkylene) group, optionally containing one or more fluorine substituents; and Q is selected from the group consisting of $-N^\oplus R^{22}_3$, $-P^\oplus R^{23}_3$ and $-S^\oplus R^{23}_2$ in which the groups $R^{22}$ are the same or different and each is selected from the group consisting of hydrogen, alkyl of 1 to 6 carbon atoms, $C_{1-6}$ hydroxyalkyl, aryl, and $C_{7-12}$ aralkyl, or two of the groups $R^{22}$ together with the nitrogen atom to which they are attached form an aliphatic heterocyclic ring containing from 5 to 7 atoms, or the three groups $R^{22}$ together with the nitrogen atom to which they are attached form a fused ring structure containing from 5 to 7 atoms in each ring, and optionally one or more of the groups $R^{22}$ is substituted by a hydrophilic functional group, and the groups $R^{23}$ are the same or different and each is $R^{22}$ or a group $OR^{22}$, where $R^{22}$ is as defined above mutatis mutandis.

20. An emulsion polymerization process according to claim 19 in which $Y^2$ is $H_2C=CR^{19}COA—$, in which $R^{12}$ is hydrogen or methyl and A is —O— or —NH—, $B^2$ is straight chain $C_{2-6}$ alkanediyl group and Q is —$N^{\oplus}R^{33}{}_3$ where each $R^{22}$ group is a $C_{1-4}$ alkyl group.

21. An emulsion polymerization process according to claim 1 comprising further adding to the oil-in-water emulsion a reactive monomer having the general formula IX $$Y^3B^3Q^1 \qquad \qquad IX$$

in which $Y^3$ is an ethylenically unsaturated group selected from the group consisting of $H_2C=CR^{24}—CO—A^{11}—$, $H_2C=CR^{24}—C_6H_4—A^{12}—$, $H_2C=CR^{19}—CH_2A^{13}$, $R^{26}O—CO—CR^{24}=CR—CO—O—$, $R^{24}CH=CH—CO—O—$, $R^{24}CH=C(COOR^{26})CH_2—CO—O—$,

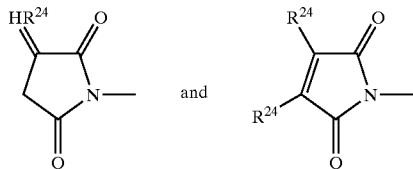

and $A^{11}$ is —O— or —$NR^{25}$;

$A^{12}$ is selected from the group consisting of a bond, $(CH_2)_rA^{13}$ and $(CH_2)_rSO_3—$ in which r is 1 to 12;

$A^{13}$ is selected from the group consisting of a bond, —O—, O—CO—, CO—O, —CO—$NR^{25}$—, —$NR^{25}$—CO, —O—CO—$NR^{25}$—, and $NR^{25}$—CO—O—;

$R^{24}$ is hydrogen or $C_{1-4}$ alkyl;

$R^{25}$ is selected from the group consisting of hydrogen, $C_{1-4}$ alkyl and $B^3Q^1$.

$R^{26}$ is hydrogen or $C_{1-4}$ alkyl;

$B^3$ is selected from the group consisting of a bond, straight and branched alkanediyl, alkylene oxaalkylene, and alkylene (oligooxalkylene) groups, optionally containing one or more fluorine substituents.

$Q^1$ is a reactive group selected from the group consisting of aldehyde groups; silane and siloxane groups containing one or more substituents selected from halogen atoms and $C_{1-4}$-alkoxy groups; hydroxyl; amino; carboxyl; epoxy; —CHOHCH$_2$Hal (in which Hal is selected from chlorine, bromine and iodine atoms); succinimido; tosylate; triflate; imidazole carbonyl amino; optionally substituted triazine groups; cinnamyl; ethylenically and acetylenically unsaturated groups; acetoacetoxy; methylol; and chloroalkylsulphone groups; acetoxy; mesylate; carbonyl di(cycloalkyl carbodiimidoyl; and oximino.

22. An emulsion polymerization process according to claim 21 in which $Y^3$ is $H_2C=CR^{24}COA''—$ in which $R^{24}$ is hydrogen or methyl and A'' is —O— or NH—, $B^3$ is a straight chain $C_{2-6}$-alkanediyl group; and $Q^1$ is a trimethoxysilyl group.

23. An emulsion polymerization process according to claim 22 in which the monomers include a hydrophilic monomer selected from the group consisting of $C_{2-4}$ hydroxyalkyl(alk)acrylates and mono- or di- $C_{2-4}$ hydroxyalkyl(alk)acrylamides.

24. An emulsion polymerization process comprising the following steps:

i) adding an ethylenically unsaturated ammonium phosphate ester zwitterionic monomer and a water-soluble radical initiator in a first stage to an aqueous liquid to form an aqueous continuous phase;

ii) forming a monomer seed mixture comprising water-insoluble ethylenically unsaturated monomer, and water-soluble ethylenically unsaturated monomer;

iii) before, simultaneously or after step i) adding the monomer seed mixture to the aqueous continuous phase to form a water-in-oil emulsion;

iv) after both steps i) and iii) adding water-soluble initiator and initiating polymerization to form an oil-in-water dispersion of emulsion-polymerised polymer seeds;

v) forming a seed growth monomer mixture comprising water-insoluble ethylenically unsaturated monomer;

vi) dispersing the seed growth monomer to the dispersion of emulsion-polymerised seeds to form an oil-in-water seed growth emulsion;

vii) adding seed growth initiator to the seed growth emulsion and initiating seed growth polymerization in the seed growth emulsion to form a product latex.

25. An emulsion polymerization process according to claim 24 in which the composition of the combination of monomer seed mixture and zwitterionic monomer is different to the composition of the seed growth monomer mixture.

26. An emulsion polymerization process according to claim 25 in which the monomer seed mixture consists substantially only of hydrophobic ethylenically unsaturated monomer.

27. An emulsion polymerization process according to claim 26 in which the hydrophobic monomer is selected from the group consisting of $C_{1-12}$ alkyl(alk)acrylates and $C_{2-12}$-alkyl and di-alkyl(ak)acrylamides, styrene, and mixtures thereof.

28. An emulsion polymerization process according to claim 25 in which the seed growth monomer mixture comprises ethylenically unsaturated ammonium phosphate ester zwitterionic monomer.

29. An emulsion polymerization process according to claim 28 in which seed growth monomer mixture comprises water-soluble ethylenically unsaturated monomers.

30. An emulsion polymerization process according to claim 29 in which the said water-soluble monomers comprise a hydrophilic monomer.

31. A process according to claim 29 in which the said water soluble monomers include acrylic or methacrylic acid.

32. An emulsion polymerization process according to claim 29 in which the said water-soluble monomers include a cationic monomer, of the general formula VIII $$Y^2 B^2 Q \qquad \qquad VIII$$

in which $Y^2$ is an ethylenically unsaturated group selected from the group consisting of $H_2C=CR^{19}—CO—A^8—$, $H_2C=CR^{19}—C_6H_4—A^9—$, $H_2C=CR^{19}—CH_2A^{10}$, $R^{21}O—CO—CR^{19}=CR^{19}—CO—O—$, $R^{19}CH=CH—CO—O—$, $R^{19}CH=C(COOR^{21})CH_2—CO—O—$,

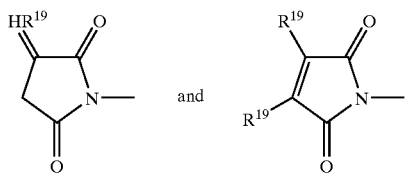

$A^8$ is —O— or —NR$^{20}$—;

$A^9$ is selected from the group consisting of a bond, $(CH_2)_qA^{10}$ and $(CH_2)_qSO_3$— in which q is 1 to 12;

$A^{10}$ is selected from the group consisting of a bond, —O—, O—CO—, —CO—O, —CO—NR$^{20}$—, —NR$^{20}$—CO, O—CO—NR$^{20}$—, and NR$^{20}$—CO—O—;

$R^{19}$ is hydrogen or $C_{1-4}$ alkyl;

$R^{20}$ is selected from the group consisting of hydrogen, $C_{1-4}$ alkyl and BX;

$R^{21}$ is hydrogen or $C_{1-4}$ alkyl;

$B^2$ is selected from the group consisting of a bond, and straight and branched alkanediyl, alkylene oxaalkylene, and alkylene (oligooxalkylene) group, optionally containing one or more fluorine substituents; and Q is selected from the group consisting of —N$^⊕$R$_3^{22}$,—P$^⊕$R$^{23}_3$ and —S$^⊕$R$^{23}$ in which the groups R$^{22}$ are the same or different and each is selected from the group consisting of hydrogen, alkyl of 1 to 6 carbon atoms, $C_{1-6}$ hydroxyalkyl, aryl, and $C_{7-12}$ aralkyl, or two of the groups R$^{22}$ together with the nitrogen atom to which they are attached form an aliphatic heterocyclic ring containing from 5 to 7 atoms, or the three groups R$^{22}$ together with the nitrogen atom to which they are attached form a fused ring structure containing from 5 to 7 atoms in each ring, and optionally one or more of the groups R$^{22}$ is substituted by a hydrophilic functional group, and the groups R$^{23}$ are the same or different and each is R$^{22}$ or a group OR$^{22}$, where R$^{22}$ is as defined above mutatis mutandis.

33. An emulsion polymerization process according to claim 32 in which Y$^2$ is H$_2$C=CR$^{19}$COA—, in which R$^{12}$ is hydrogen or methyl and A is —O— or —NH—, B$^2$ is straight chain $C_{2-6}$ alkanediyl gruop and Q is —N$^⊕$R$_3^{22}$ where each R$^{22}$ group is a $C_{1-4}$ alkyl group.

34. An emulsion polymerization process according to claim 24 in which at least a portion of seed growth monomers are premixed before being added to the continuous phase in step iv.

35. An emulsion polymerization process according to claim 34 in which the seed growth monomer mixture is continuously fed into the oil-in-water dispersion compositions of emulsion-polymerised seeds over a monomer feed period during which polymerization continues.

36. An emulsion polymerization process according to claim 35 comprising providing an initiator feed comprising the seed growth initiator and continuously feeding the initiator feed, into the oil-in-water dispersion comprising emulsion polymerised seeds throughout the monomer feed period.

37. An emulsion polymerization process according to claim 35 in which a portion of initiator feed is added to the polymerised growth polymerization mixture after all the premixed seed growth monomer mixture has been added under conditions such that radicals are formed from the initiator.

38. An emulsion polymerization process according to claim 36 in which the initiator feed comprises water-soluble monomer.

39. An emulsion polymerization process according to claim 38 in which the water-soluble monomer comprises a sulpho- or carboxy-betaine monomer.

40. An emulsion polymerization process according to claim 24 in which the latex product comprises a stable dispersion of polymer particles, having a polymer concentration in the range 20 to 60% by weight.

41. An emulsion polymerization process according to claim 24 in which the latex product comprises a dispersed phase having a particle diameter less then 1 μm.

42. An emulsion polymerization according to claim 41 in which the particle diameter is in the range 100 to 400 μm.

* * * * *